Oct. 4, 1949.　　　　A. A. CARLSON　　　　2,483,690
DUST COLLECTOR

Filed Sept. 9, 1946　　　　　　　　　　　　3 Sheets-Sheet 1

INVENTOR
ALBIN A. CARLSON
BY Liverance and
Van Antwerp
ATTORNEYS

INVENTOR
ALBIN A. CARLSON
BY Liverance and
Van Antwerp
ATTORNEYS

Oct. 4, 1949. A. A. CARLSON 2,483,690
DUST COLLECTOR
Filed Sept. 9, 1946 3 Sheets-Sheet 3

INVENTOR
ALBIN A. CARLSON
BY Liverance and
Van Antwerp
ATTORNEYS

Patented Oct. 4, 1949

2,483,690

UNITED STATES PATENT OFFICE 2,483,690

DUST COLLECTOR

Albin A. Carlson, Minneapolis, Minn.

Application September 9, 1946, Serial No. 695,598

4 Claims. (Cl. 183—37)

The present invention relates to dust collectors.

An object and purpose of the present invention is to provide a novel construction and one which may be economically fabricated and its parts readily assembled through which air, carrying therewith dust in suspension, is drawn to remove the dust in the air, so that after it has passed through the collector, the air is cleansed of the dust, either completely or to a very substantial degree. One primary object and purpose of the present invention is to provide a dust collector structure, having tortuous paths of movement of the air which carries the dust through it, with provision of means for controlling the speed of movements of the air through the structure, whereby the dust, in one form of the invention, is helped to separate from the air current and fall by gravity to a lower position to a receptacle therefor, which may from time to time be emptied, and with separate stages of the gravity separation of the dust from the air, the larger or heavier particles separating from the air in the first stage, and the lighter and more impalpable dust particles separating in a succeeding stage. And a still further object of the invention is to provide screening means through which the air passes immediately before reaching the outlet of the dust collector, to obstruct the passage of dust, with means also to readily separate and remove dust which may be collected at the outside of the screen so that it may fall by gravity, with a reconditioning of the screen for further service and a removal of the obstruction to air passage which too great a collection of dust at the outside of the screen would impose.

An understanding of the invention may be had from the following description taken in connection with the accompanying drawings, in which, Fig. 1 is a vertical section through the dust collector of my invention, substantially on the plane of line 1—1 of Fig. 2.

Figs. 2 and 3 are horizontal sections on the planes of lines 2—2 and 3—3 of Fig. 1, looking in a downward direction.

Figure 8:
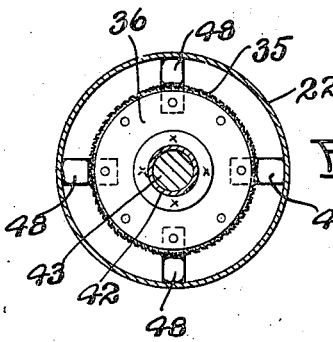
Figure 5:
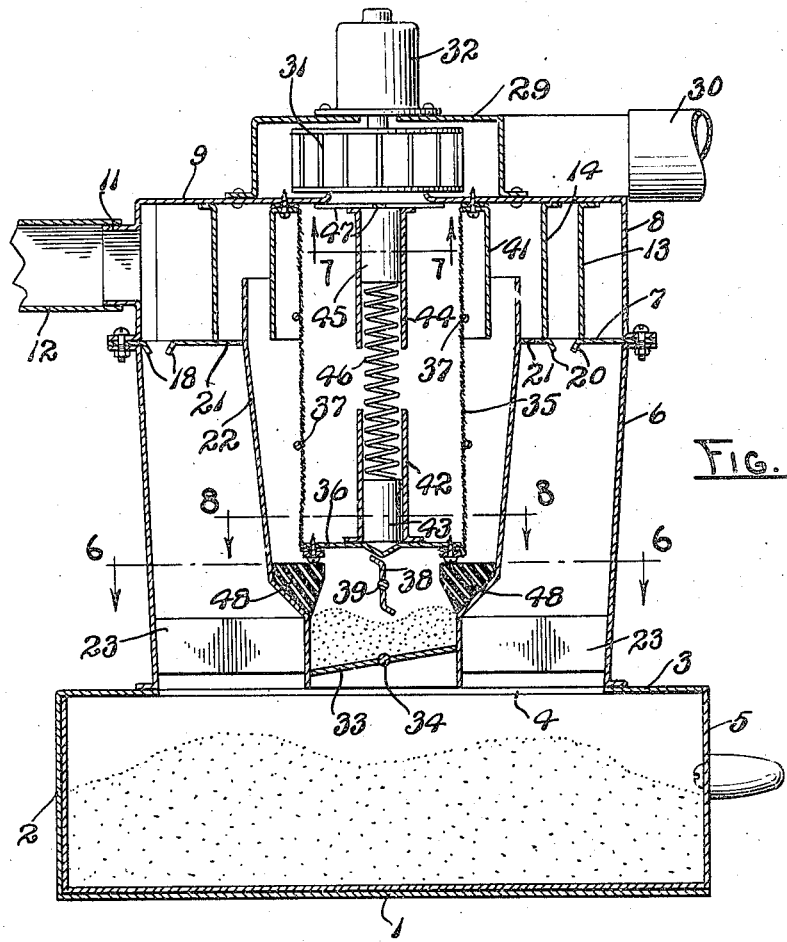
Fig. 5 is a vertical section, similar to Fig. 1, illustrating a modified form of structure operating on substantially the same principal and incorporating a dust screen addition.
Figure 6:
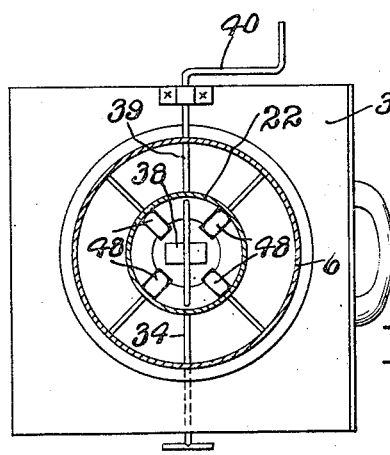
Figure 7:
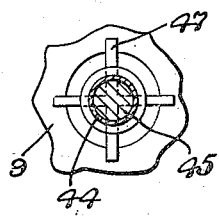

Figs. 6, 7 and 8 are horizontal sections taken substantially on the planes of lines 6—6, 7—7 and 8—8 of Fig. 5, in the directions indicated by the arrows.

Like reference characters refer to like parts in the different figures of the drawings.

At the lower end of the dust collecting structure, a casing, preferably of thin metal, is provided having a bottom 1, a closed vertical end 2, vertical sides and a top 3, the center portion of the top having an opening 4 relatively large size therethrough, preferably circular in outline. Such casing is open at one end for the insertion and removal of a drawer 5 therein. The casing provides a supporting base for the structure above it.

In the construction of the immediate dust collector above the top 3, a generally vertical cylinder 6 of thin metal is provided having an open lower end, the interior diameter of which is approximately the same as the diameter of the opening 4, and at the lower end of the cylinder 6 an out-turned annular flange is made for resting upon and connecting to the top 3. The upper end of the cylindrical body 6 likewise has an outwardly extending annular horizontal flange. Across the upper end of the cylindrical body 6 a metal plate 7 is located, extending to and over said upper flange. Above the plate 7, a dome having a vertical cylindrical wall 8 and a top 9 is located with an outwardly extending annular flange at the lower edges of the wall 8, the exterior diameter of which is substantially the same as the diameter of the upper flange on the body 6. Said flange, and the edge portions of the plate 7, between them are securely fastened together by means of stove bolts or equivalent fasteners. The horizontal top 9 of the dome has a central outlet opening 10.

Figure 2:
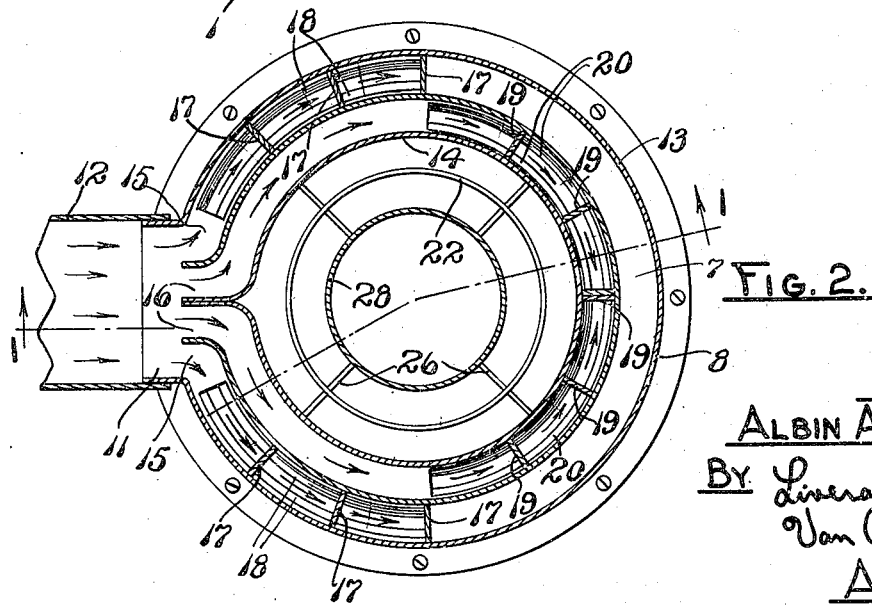
Figure 4:
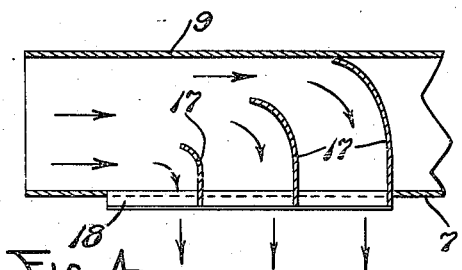
Fig. 4 is a fragmentary vertical section through the air entrance passages, showing the spaced air deflecting means used for obtaining substantially uniformity of air inlet flow.

At one side of the dome in the wall 8, an air inlet 11 is provided to which a conduit 12 may be connected for carrying substantially cylindrical walls 13 and 14, the first spaced inwardly from the outer wall 8, and the second spaced from the first wall 13, are secured by flanges at the upper edges of the walls or partitions 13 and 14 welded or otherwise connected with the top 9. At the entrance 11, passages for the air, 15 and 16, are thus made between the partition 14 and the outer wall 8, and between the partitions 13 and 14, as shown in Fig. 2, the openings leading to such passages being in direct alined conjunction with the air passage 11. The ring shaped zone between the partitions 13 and the outer wall 8 is obstructed by spaced air directing cross partitions 17, of different heights, as shown in Fig. 4, made of thin metal. In the plate 7, between the last of said partitions 17 and the entrance at 15, arcuate slots are provided by striking the plate 7 downwardly in two spaced downwardly converging lips 18, making a communication between the passages 15 and the chamber surrounded by cylinder 6. The passage 16 which is continuous around the inner wall 14 is likewise provided with like partitions 19 between its ends, and similar arc shaped slots are made in the plate 7 by striking the metal of said plate downwardly in two spaced downwardly converging lips 20, thereby making a like communication with the chamber surrounded by the cylinder 6, but farther inward from the air entrances to the passage 16 than the previously described slots are from the entrance to the passages 15.

Figure 1:
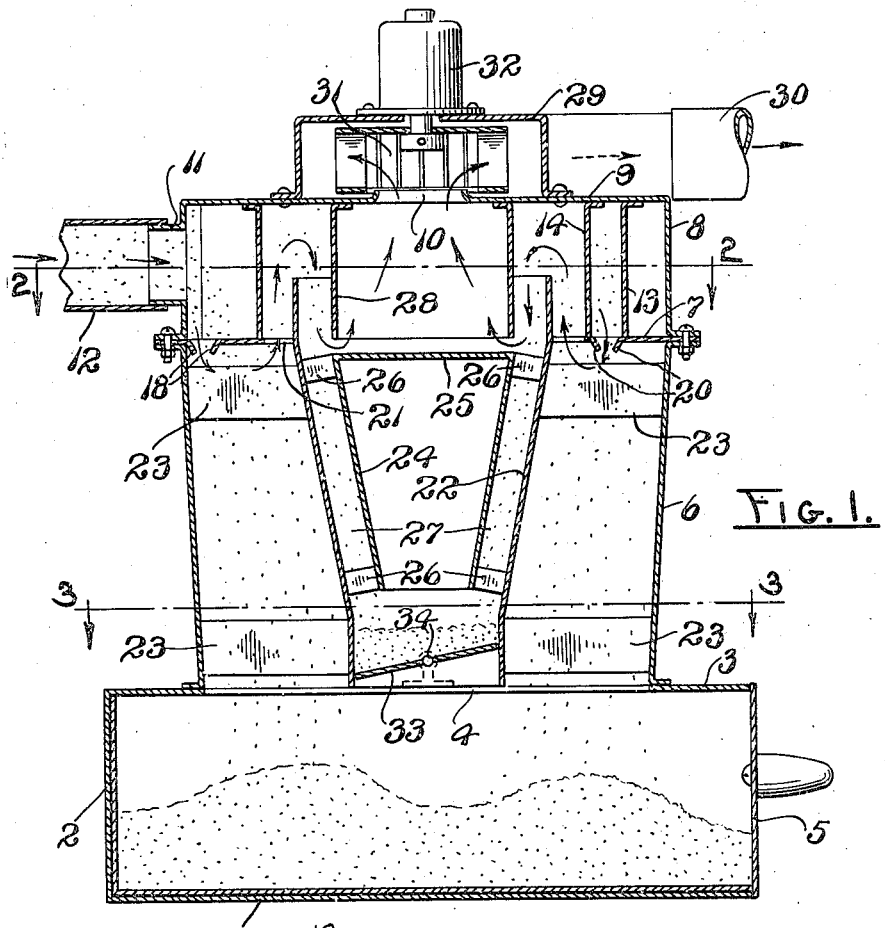

The plate 7 immediately inside of the partition 14 is provided with a circular opening 21. A vertical member 22 having cylindrical upper and lower ends, the upper end being of a larger diameter than the lower end, and with inclined walls connecting the two cylindrical portions, is supported by sheet metal arms 23 extending therefrom to the cylinder 6. It is located centrally of the opening 4 in the top 3 previously mentioned, and extends to and above opening 21 in the horizontal plate 7, as shown. Within the intermediate portion of the member 22, a member 24 having conical downwardly converging sides and a horizontal top 26 closing the upper end thereof, is suspended between the intermediate frustro-conical portion of the member 22 being spaced and held therefrom by supports 26, to provide a continuous annular passage 27 between the inclined walls of the two members 22 and 24, as shown in Fig. 1.

A cylinder 28, the exterior diameter of which is substantially the same as the diameter of the top 26, is connected to and suspended from the top 9. At its lower end it is spaced a short distance above said horizontal top 25 and at its upper end is around the central opening 10 in the top 9 of the upper dome.

Figure 3:
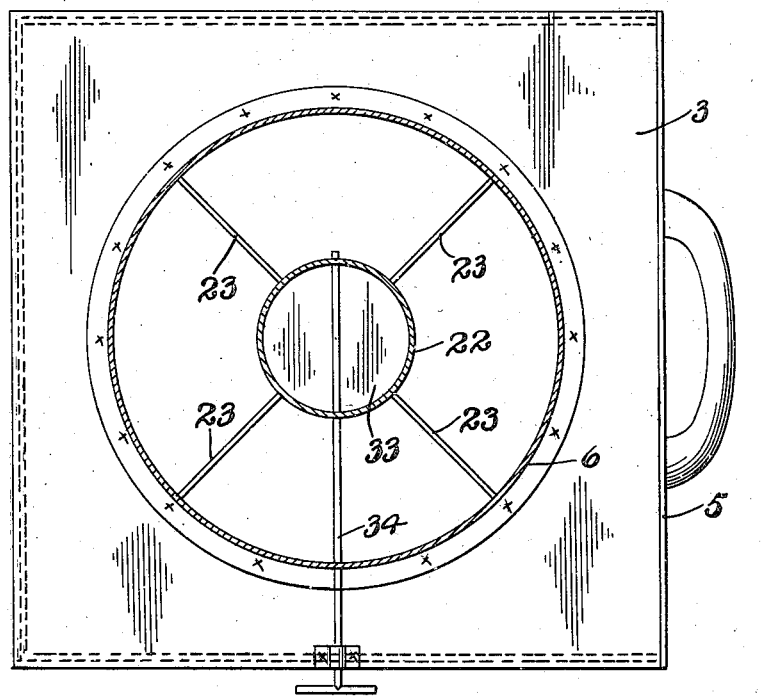

A fan housing 29, open at its lower side is secured on and above the top 9 of the dome at one side having an air outlet 30. Within the housing 29 a fan 31 is located over the opening 10, and is driven by a motor 32. In the operation of the dust collector, with the construction described, the dust carrying air from the conduit 12, passing the entrance at 11, follows the passages 15 and 16 and directed by the vanes or partitions 17 and 19, is carried downwardly through the slots between the downwardly converging lips 18 and 20 into the chamber surrounded by the cylinder 6. Through the Venturi action coming from the narrowed outlets between said lips 18 and 19, the air passes into the cylinder 6 with increased velocity and escapes therefrom through the opening 21 around the upper end of the member 20 being slowed down in velocity before coming thereto, and is then directed in the path indicated by the arrows downwardly into said member around the lower end portion of the cylinder 28 and thence into the lower end of said cylinder 28 passing out at the outlet 10 into the housing 29 therefrom through the outlet at 30. The heavier particles of dust will fall by gravity downwardly through the chamber within the cylinder 6 and through the opening 4 into the drawer at 5. A slowing up of the air in velocity as it passes into the lower end of the cylinder 28, because of the restriction in passage, causes dust to likewise drop by gravity through the annular passage at 27 to a damperlike closure 33 mounted in the lower end of the member 22. Said closure 33 is mounted on a transverse rod 34 for rocking movement, which rod at its outer end (Fig. 3) may be manually turned to deliver the dust collected into the drawer. Said drawer from time to time may be withdrawn and the collected dust dumped therefrom and the drawer released.

In Figs. 5 to 8 inclusive the member 24 is not used and is replaced by a cylindrical screen 35 closed at its lower end by a closure plate 36 and surrounded at spaced apart parts in its length by wire rings 37. The screen is connected at its upper end to the lower side of the top 9. Its lower closure plate 36 is located a distance above the damper closure 33 mounted on a rock shaft 34, and between the side walls of the generally cylindrical member 22 and the screen 35 there is an annular passage, similar to the passage 37 in the first described structure.

A rod or shaft 39 is located above the damper rod 34 on which an agitator 38 is secured below the bottom 36, which bottom at its center is pressed downwardly so that the ends of the agitator 38 strike it in rapid succession and vibrate it upon turning rod 39 by a crank 40 (Fig. 6) which may be manually operated. The upper portion of the screen 35 is surrounded by a cylindrical sleeve 41 connected to the top 9 by the same connections used to secure the upper end of the screen, and extending downwardly a distance below the upper end of the member 22.

At the upper side of the lower closure plate 36 a cylindrical guide sleeve 42 is permanently secured and is located at its lower portion around a cylindrical block 43, the lower end of which comes to the upper side of the closure 36. A similar sleeve 44 surrounds and is connected with a similar cylindrical block 45 located in the upper portion thereof, being disposed in vertical axial alinement with the sleeve 42. A coiled compression spring 46 enters the open adjacent ends of the sleeves, at its ends bearing upon the blocks 43 and 45. The upper sleeve 44 and its associated block 45 are secured to cross bars 47 which are welded or otherwise connected at their ends to the lower side of the top 9, being located directly under the opening on said top which leads to the fan chamber 29. Within the lower portion of the member 22 a plurality of spaced resilient bumpers 48 are secured. The compression spring 46 maintains the screen 45 in a taut condition and normally brings the lower end of the screen structure to a position where it may rest upon the bumpers 48. When the rod 39 is rotated and the agitator 38 rapidly lifts and releases the plate 36, the striking against the bumpers which occurs on such release jars the screen structure, thereby loosening and freeing dust from the outer side of the screen which is eventually dumped into the drawer at 5.

The operation is upon substantially the same principles as in the structure previously described. The air passes upwardly at the outer side of the member 22, is directed downwardly over its upper edge and against the screen because of the interposed walls of the member 41, so that dust carrying air comes against all or substantially all of the outer screen surface, and is freed of its dust when it passes through the screen being drawn by the fan and delivered at the outlet 30.

The constructions described after full test and trial, have proved very satisfactory. They are readily manufactured and assembled. The screen element may be replaced at times when desired, the separation of the dome with the attached screen being readily done by disconnecting the flanges at the lower end of the dome wall 8 from the upper end of the body 6.

The invention is defined in the appended claims and is to be considered comprehensive of all forms of structure coming within their scope.

I claim:

1. A dust collector comprising a vertical cylindrical chamber having a top with a central opening therein, a dust receptacle communicating with the bottom of said chamber and closed to the exterior, an annular conduit in the upper part of said chamber having air passages in its lower side, an air inlet passage for said annular conduit, a vertical generally cylindrical shell having open top and bottom, the upper end of said shell being located within and spaced from said annular conduit and above the bottom thereof and the bottom of said shell communicating with said dust receptacle, a movable closure for the bottom of the shell, a second cylindrical shell surrounding said opening in the top of the chamber and extending downwardly into and spaced from the upper end of said first shell, an air filter extending downwardly from the top of the chamber through said second shell and into said first shell and spaced from both shells, the upper end of said filter communicating with said central opening in the top of the chamber, an exhaust conduit communicating with said central opening, and means for exhausting air through said exhaust conduit.

2. The elements of claim 1 in which said air filter is a fine mesh fabric bag having a closed bottom and spring means acting to extend said bag longitudinally.

3. The elements of claim 2 combined with manual means to agitate said bag.

4. The elements of claim 3 in which said manual means acts against the bottom of said bag to vibrate it against action of said spring means.

ALBIN A. CARLSON.

REFERENCES CITED

The following references are of record in the file of this patent:

UNITED STATES PATENTS

| Number | Name | Date |
| --- | --- | --- |
| 1,601,148 | Ruemelin | Sept. 28, 1926 |
| 2,321,653 | Carlson | June 15, 1943 |
| 2,375,608 | Young | May 8, 1945 |